United States Patent
Kindred et al.

(10) Patent No.: US 8,229,147 B2
(45) Date of Patent: Jul. 24, 2012

(54) HEARING ASSISTANCE DEVICES WITH ECHO CANCELLATION

(75) Inventors: Jon S. Kindred, Minneapolis, MN (US); Jeffrey Paul Solum, Deephaven, MN (US)

(73) Assignee: Strakey Laboratories, Inc., Eden Prairie, MN (US)

( * ) Notice: Subject to any disclaimer, the term of this patent is extended or adjusted under 35 U.S.C. 154(b) by 556 days.

(21) Appl. No.: 12/402,849

(22) Filed: Mar. 12, 2009

(65) Prior Publication Data
US 2010/0232632 A1 Sep. 16, 2010

(51) Int. Cl.
*H04R 25/00* (2006.01)
(52) U.S. Cl. ................................ 381/315; 381/326
(58) Field of Classification Search ............ 381/326, 381/315
See application file for complete search history.

(56) References Cited

U.S. PATENT DOCUMENTS

| 7,876,906 B2* | 1/2011 | Abolfathi | 381/23.1 |
| 2007/0274535 A1* | 11/2007 | Mao | 381/94.1 |
| 2007/0280491 A1* | 12/2007 | Abolfathi | 381/313 |

* cited by examiner

*Primary Examiner* — Jerome Jackson, Jr.
*Assistant Examiner* — Dale E Page
(74) *Attorney, Agent, or Firm* — Schwegman, Lundberg & Woessner, P.A.

(57) ABSTRACT

According to various embodiment of a method of operating a hearing instrument, an acoustic signal pathway is provided from a microphone through a signal processor to a hearing instrument (HI) receiver in an acoustic mode of operation. An RF transmit signal pathway is provided from the microphone to an RF transmitter, and an RF receive signal pathway is provided from the RF receiver through the signal processor to the HI receiver in an RF mode of operation. An input signal representative of sound detected by the microphone is adaptively filtered. A first adaptation rate is used for the acoustic mode of operation and a second adaptation rate is used for the RF mode of operation. The second adaptation rate is faster than the first adaptation rate.

22 Claims, 7 Drawing Sheets

HEARING ASSISTANCE DEVICES WITH ECHO CANCELLATION

TECHNICAL FIELD

This application relates generally to hearing assistance devices, and more particularly to cancelling, removing or diminishing echo in hearing assistance devices.

BACKGROUND

Examples of hearing assistance devices, also referred to herein as hearing instruments, include both prescriptive devices and non-prescriptive devices. Examples of hearing assistance devices include, but are not limited to, hearing aids, headphones, assisted listening devices, and earbuds.

Modern hearing instruments are typically equipped with a feedback cancellation circuit which helps prevent oscillations due to feedback from the receiver output to the microphone input. The feedback canceller is designed to adapt slowly on signals that are time stationary over relatively long intervals compared with speech. However, if the hearing instrument is used in two-way communication system, the feedback canceller does not address echo produced by the acoustic and/or electrical feedback of signals.

SUMMARY

An embodiment of a hearing instrument, comprises a microphone, a hearing instrument (HI) receiver, a signal processor, an RF antenna, an RF receiver and an RF transmitter. The hearing instrument is configured to operate in an acoustic mode and an RF mode. In the acoustic mode, the signal processor processes a signal representative of a sound detected by the microphone into a processed signal, and the HI receiver outputs an audio signal representative of the processed signal. In the RF mode, the RF transmitter transmits, using the antenna, a signal representative of a sound detected by the microphone, the signal processor processes a signal representative of a signal received by the RF receiver using the antenna, and the HI receiver outputs an audio signal representative of the processed signal.

A hearing instrument embodiment comprises a microphone, a hearing instrument (HI) receiver, a signal processor, an RF receiver, an RF transmitter, and a mode specific adjuster adapted to adjust signal pathways when switching between acoustic and RF modes of operation. For the RF mode of operation, the mode specific adjuster provides an RF receive signal path from the RF receiver to the signal processor, and an RF transmit signal path from the microphone to the RF transmitter. For the acoustic mode of operation, the mode specific adjuster provides an acoustic signal path from the microphone to the signal processor.

According to various embodiment of a method of operating a hearing instrument, an acoustic signal pathway is provided from a microphone through a signal processor to a hearing instrument (HI) receiver in an acoustic mode of operation. An RF transmit signal pathway is provided from the microphone to an RF transmitter, and an RF receive signal pathway is provided from the RF receiver through the signal processor to the HI receiver in an RF mode of operation.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

An example of a hearing instrument is a hearing aid. A hearing aid generally amplifies or processes sound to compensate for poor hearing and is typically worn by a hearing impaired individual. In some instances, the hearing aid adjusts or modifies a frequency response to better match the frequency dependent hearing characteristics of a hearing impaired individual. Individuals may use hearing aids to receive audio data, such as digital audio data and voice messages, which may not be available otherwise for those who have a hearing impairment.

Figure 1:
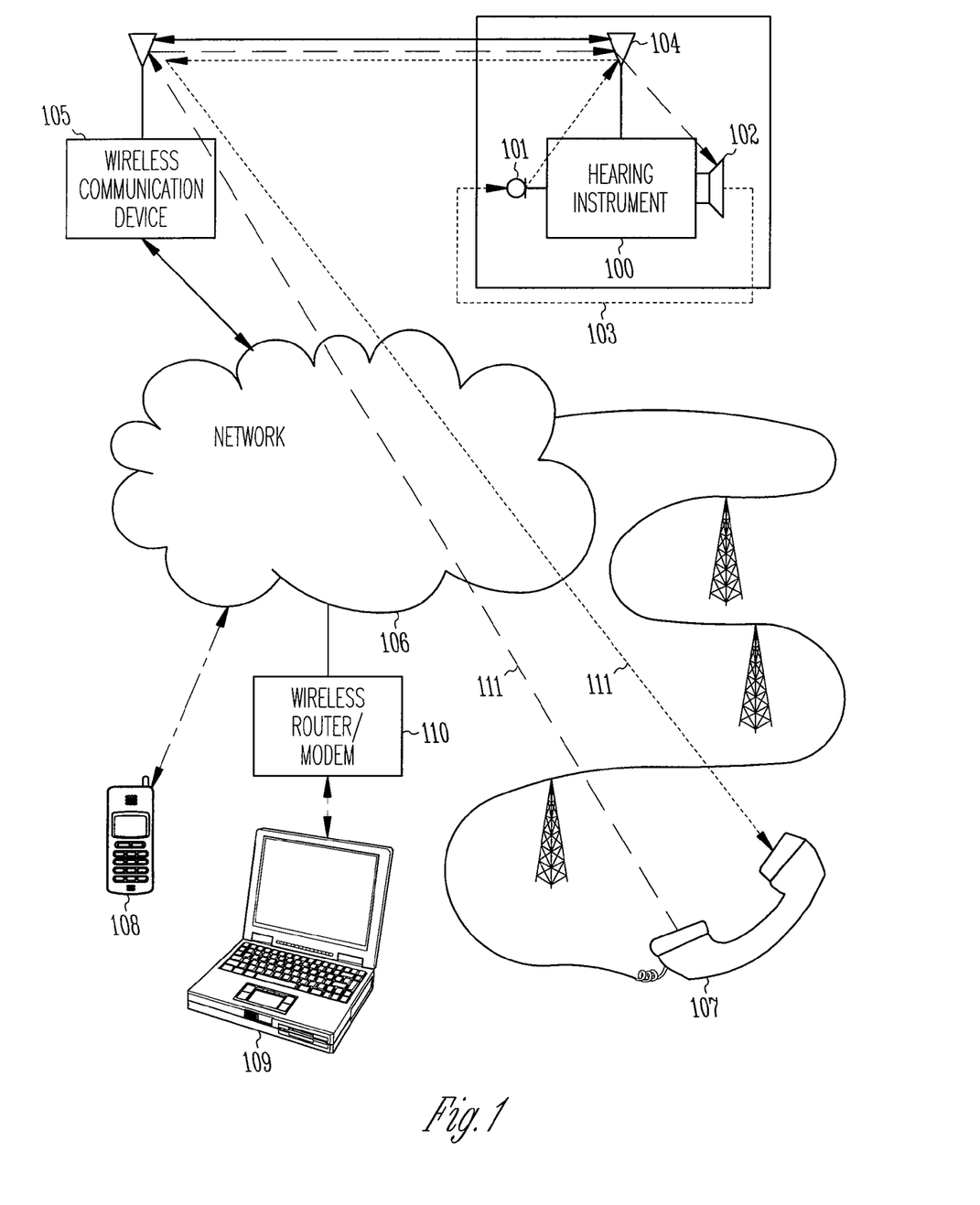
FIG. 1 illustrates an environment for a hearing instrument, according to various embodiments.

FIG. 1 illustrates an environment for a hearing instrument, according to various embodiments. In addition to processing acoustic sounds detected near the wearer of the hearing instrument, the illustrated hearing instrument also is adapted to communicate with other devices, enabling two-way wireless communication. The hearing instrument 100 includes a microphone 101 and a receiver (speaker) 102. When operating in an acoustic mode, the microphone picks up ambient sounds and converts the sounds into an electrical signal. The receiver converts a processed electrical signal into an audible signal for the wearer of the hearing instrument. Acoustic feedback occurs if the sound produced by the receiver is directly or indirectly coupled to the microphone, as represented in a simplified manner at 103. Sustained feedback occurs at certain frequencies where the gain through the forward path is greater than the attenuation through a feedback path. The feedback path alters with changes in the environment. Feedback cancellers may include notch filters or phase-cancellers.

The network may be a single network or a combination of different networks and different types of networks, including but not limited to various combinations of a Local Area Network (LAN), Wireless LAN (WLAN), Wide Area Networks (WAN), Cellular Networks, PSTN networks, and VoIP networks such as the Internet. The wireless communication device 105 (e.g. a Bluetooth device or a Wireless Audio Controller (WAC) module) provides the interface between the hearing instrument 100 and consumer devices or the network 106. Through this network, by way of example and not limitation, the illustrated hearing instrument 100 is capable of communicating voice data with, by way of example and not limitation, landline telephone systems 107, cell phones 108, and computers 109. The illustrated computer 109 is shown connected to the network 105 via a wireless router and modem 110. The computer 109 may be equipped with a microphone along with its speakers, to enable voice communication similar the voice communication enabled by the microphones and receivers for the phones 107 and 108. In a communication channel between phone 107 and hearing instrument 100, for example, echoes may be caused by a number of factors, including electrical echo in the network devices and acoustic echo for the hearing instrument 100 and phone 107. Thus, a person speaking into phone 107 over a channel 111 to a wearer of a hearing instrument 100 may hear his or her own voice with an unacceptable delayed echo.

The microphone 101 and receiver 102 of the hearing instrument 100 are collocated in the hearing instrument and are subject to an acoustic feedback that should be cancelled out using the hearing instrument. An embodiment of the hearing instrument is operated in a normal acoustic mode and a wireless mode. When operating in the normal acoustic mode, an acoustic signal from the microphone is processed in such a way so as to "enhance" the wearer's ability to hear. This usually involves amplification and equalization, which can produce acoustic feedback via path 103. The feedback is canceled using an adaptive filter.

The hearing instrument 100 operates in the wireless mode to communicate audio through a communication link. The illustrated communication link has a relatively long delay. When the hearing instrument 100 operates in the wireless mode, the microphone input is decoupled from the output, the wireless input signal is used as the training signal for the adaptive filter. The hearing instrument wearer is limited in this mode to hearing only the wireless input and no microphone input or local sidetone. The user listens to the wireless input in one ear and his or her own acoustic sidetone in the other ear. In the wireless mode the echo cancellation algorithm is modified by changing the adaption coefficient and the adaptation filter such that it can sufficiently cancel the echo for the wireless communication. These modifications transform the acoustic feedback canceller into an effective echo canceller. According to an embodiment, the adaptation rate is set equal to or approximately equal to the sample rate of the incoming wireless samples.

An echo may occur in voice transmissions because of many causes (e.g. line impedance discontinuities or the interaction between microphones and loudspeakers in an environment). These perturbations are annoying and reduce the intelligibility of conversations. Echo in a communication link may be caused by an introduced delay as audio samples are accumulated and packetized for transmission, an introduced delay as packets are transferred over the wireless hearing instrument interface, an introduced delay as received packets are supplied at a consistent rate for conversion back into audio samples, a processing delay within a hearing instrument, and acoustic feedback within the hearing instrument. All of these may contribute to the echo cancellation problem, and add to the complexity of solving this problem. Some sources of echo are an multi-path effect, group delay, and a processing delay over the wireless hearing interface, which can occur in both one-way and two-way communications. Two-way communication applications have more potential sources of echo, which combine to increase the length of the round trip delay. In digital mobile phone systems, for example, voice signals are digitized, compressed and coded within the mobile handset, and then processed at the radio frequency interface of the network. The total delay introduced by the various stages of digital signal processing range from 80 ms to 100 ms, resulting in a total round-trip delay of 160-200 ms for any echo. A delay of this magnitude will make any appreciable echo disruptive to the communication process. For example, a person talking on phone 107 to the wearer of hearing instrument 100 may hear his or her own voice with an unacceptable echo over the communication circuit 111.

The perceived effect of an echo depends on its amplitude and time delay. In general, echoes with an appreciable amplitude and a delay of more than 1 ms are noticeable. If the round-trip delay is on the order of a few milliseconds, echo gives a telephone call a sense of "liveliness". However, echoes become increasingly annoying and objectionable with the increasing round-trip delay and amplitude in particular for delays of more than 20 ms. The two echo types differ in cause and effect and offer a challenging problem when both combine on the same call in the same network. In wireless networks, or digital-cellular calls, there is no hybrid on the mobile end of the call. The source of echo is acoustic coupling in the mobile handset, and this ambient echo depends on the environment in which the handset is located. Multiple delays can occur from the speaker's voice rebounding off surfaces at various distances from the handset. By its very nature, the "wireline" end of the call has a "leaky" hybrid interface. As voice signals pass from the four-wire to the two-wire portion of the network, the higher energy level in the four-wire section reflects back on itself within the hybrid, creating echo. Echo cancellation creates a model of the echo path, synthesizes a replica estimate of the echo, and cancels the echo by subtracting the estimated echo from the true echo. This process allows full-duplex speech between the near and distant callers and results in natural, interactive speech.

Two general kinds of echoes in communication systems are the electric echo and the acoustic echo. The electric echo is also referred to as a hybrid echo or line echo. This echo can be found in the public-switched telephone network (PSTN), mobile, and IP phone systems. The electric echo can be generated from both the near end and the far end electric devices.

Acoustic echo may occur when a speaker/receiver and microphone are placed such that the microphone picks up the signal radiated from the speaker/receiver and its reflections. In the case of telecommunications systems, users are annoyed by listening to their own speech delayed by the round trip time of the signal to the receiver, to the microphone and back. To avoid these problems, the attenuation of the acoustic path between the loudspeaker and the microphone must be sufficiently high. This attenuation can be provided by mechanical separation and/or an adaptive filter.

Electric or hybrid echo may occur, by way of example, as voice signals pass through different line impedances in a communication network (e.g. 4 wire to 2 wire). As voice signals pass from the four-wire to the two-wire portion of the network, for example, the higher energy level in the four-wire section reflects back on itself within the hybrid, creating echo. Real hybrid circuits cannot be 100% ideal because of the leakage, and the parasitic or parametric deviations. Therefore, part of the signal takes the wrong path from both the near end hybrid and the far end hybrid and thus becomes echo. In older telephone systems, the echo is 28 ms or less. In the more complex, modern telephone systems, the electric echo will be longer. For example, the electric echo in GSM systems could be up to 80 ms, and the electric echo in IP telephone could be up to 120 ms or even longer. If the total round-trip delay occurs within just a few milliseconds (i.e., within 28 ms), it generates a sense that the call is live by adding sidetone, which makes a positive contribution to the quality of the call. If the total network delay exceeds 36 ms, however, the positive benefits disappear, and intrusive echo results. Because of the non-stationary nature of various communication links, the hybrids cannot be perfectly tuned using hardware adjustments. Thus, a part of the received signal is reflected as echo, known as the electrical echo.

Acoustic echo is generated with handsets and other devices with a microphone and speaker/receiver. The speaker is referred to as a receiver for telephones and hearing instruments. Acoustic echo is produced by voice coupling between the earpiece and microphone. Sound from a speaker/receiver is heard by a listener, as intended. However, this same sound also is picked up by the microphone, both directly and indirectly, after bouncing off the roof, windows, and walls, for example. The result of this reflection is the creation of multi-path echo and multiple harmonics of echo, which, unless eliminated, are transmitted back to the distant end and are heard by the talker as echo. The echo from the undesired remote speech reflected from roof, windows, and walls, etc. could be as long as 200 ms.

Digital processing delays and speech-compression techniques further contribute to echo generation and degraded voice quality in wireless networks. Voice degradation is caused as voice compressing encoding/decoding devices (vocoders) process the voice paths within the handsets and in wireless networks. This results in returned echo signals with highly variable properties. When compounded with inherent digital transmission delays, call quality is greatly diminished for the wireline caller. Delays are encountered as signals are processed through various routes within the networks, including copper wire, fiber optic lines, microwave connections, international gateways, satellite transmission, and mixed technology digital networks where calls are processed across numerous network infrastructures. In digital wireless networks, voice paths are processed at two points in the network within the mobile handset and at the radio frequency (RF) interface of the network. As calls are processed through vocoders in the network, speech processing delays ranging from 80 ms to 100 ms are introduced, resulting in an unacceptable total end-to-end delay of 160 ms to 200 ms. As a result, echo cancellation devices are required within the wireless network to eliminate the hybrid and acoustic echoes in a digital wireless call. To further compound the delay problem, the real data must be allowed to "run ahead" to give the compression algorithm all the data it needs to perform the complex task of compression. Typically the audio is allowed to run ahead by approximate ⅛th of a second.

An echo canceller removes a caller's voice from the returning audio stream without removing the audio coming from the caller. Echo canceller technology is tuned to work correctly under the expected conditions. When echo cancellers don't work right they produce a variety of unwanted side effects (e.g. the caller hears his or her voice echoed or the caller's echo is canceled along with part of the voice of the caller).

The echo canceller employs a digital adaptive filter to set up a model or characterization of the voice signal and echo passing through the echo canceller. As a voice path passes back through the cancellation system, the echo canceller compares the signal and the model to cancel existing echo dynamically. This process may remove most (on the order of 80 to 90 percent or more) of the echo across the network. A non-linear processor (NLP) attenuates the signal of the remaining residual echo below the noise floor.

In echo cancellation, complex algorithmic procedures are used to compute speech models. This involves generating the sum from reflected echoes of the original speech, then subtracting this from any signal the microphone picks up. The result is the purified speech of the person talking. The format of this echo prediction must be learned by the echo canceller in a process known as adaptation. The parameters learned from the adaptation process generate the prediction of the echo signal.

Echo cancellers can be based on finite impulse response (FIR) filters. The echo canceller coefficients may be adapted using variants of the recursive least square error (RLS) or the least mean squared error (LMS) adaptation methods. One example of an algorithm used for adaptation of the coefficients of an echo canceller is the normalized least mean square error (NLMS) method.

Figure 2:
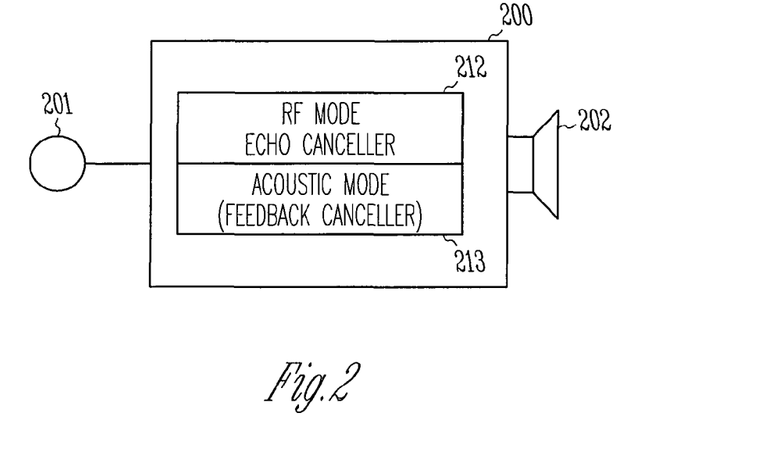
FIG. 2 illustrates an embodiment of a hearing instrument adapted to operate in one mode to cancel echoes in a communication channel and in another mode to cancel acoustic feedback.

FIG. 2 illustrates an embodiment of a hearing instrument 200 adapted to operate in one mode 212 to cancel echoes in a communication channel and in another mode 213 to cancel acoustic feedback. In the acoustic mode 213, the hearing instrument 200 uses a microphone 201 to convert a sound into an input electrical signal, processes the input electrical signal at a gain, outputs the processed electrical signal to the receiver 202 to produce a sound, and prevents or stops acoustic feedback using an adaptive filter. In the communication mode (e.g. RF mode 212), the hearing instrument 200 uses a microphone 201 to convert a sound into an input electrical signal, transmits a wireless communication signal representative of the input signal, receives a return wireless communication signal, processes the received wireless communication signal at a gain, outputs the processed signal to the receiver 202 to produce a sound, and prevents or stops echo in the transmitted wireless communication signal using an adaptive filter.

Figure 3:
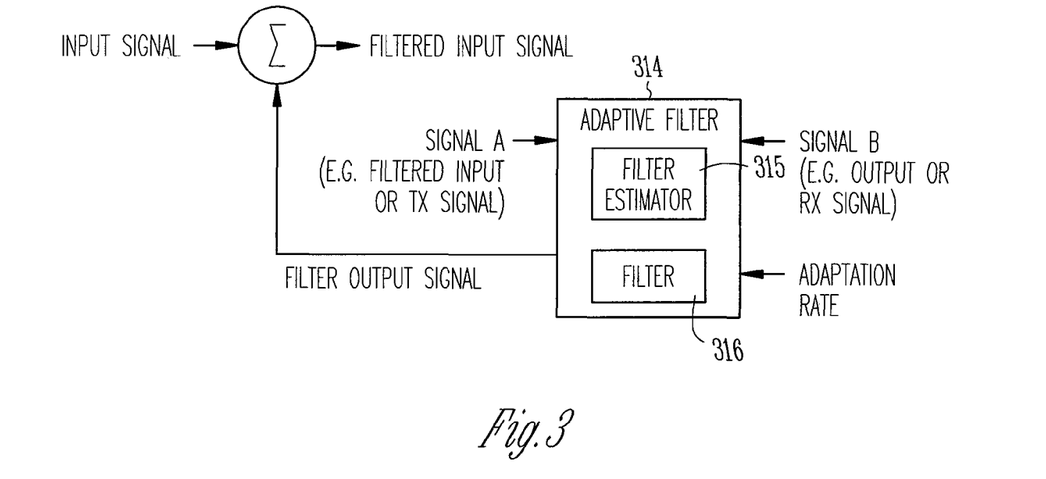
FIG. 3 illustrates an embodiment of an adaptive filter for filtering an input signal of the hearing aid.

FIG. 3 illustrates an embodiment of an adaptive filter for filtering an input signal of the hearing aid. The illustrated adaptive filter 314 includes a filter estimator 315 and a filter 316. The filter estimator 315 has input signals (signal A and signal B), and controls coefficients of the filter 314 at times based on an adaptation rate. The filter outputs a filter output signal, which is subtracted from the input signal to provide a filter input signal. According to an embodiment, the hearing instrument operating in the acoustic mode uses the filtered input signal and an output signal as the signal inputs, and the hearing aid operating in the RF mode uses an RF transmit signal and a processed RF receive signal as the signal inputs. The adaptation rate for the RF mode is faster than the adaption rate for the acoustic mode. In some embodiments, the adaptation rate for the RF mode is set approximately equal to the sampling rate of the digital sound signal in the RF transmission. The adaptive filter performs an anti-correlation function that prevents an undesired correlation between the filter input signals (signals A and B), which indicates that an undesired echo or undesired feedback is in one of the filter input signals.

Figure 4:
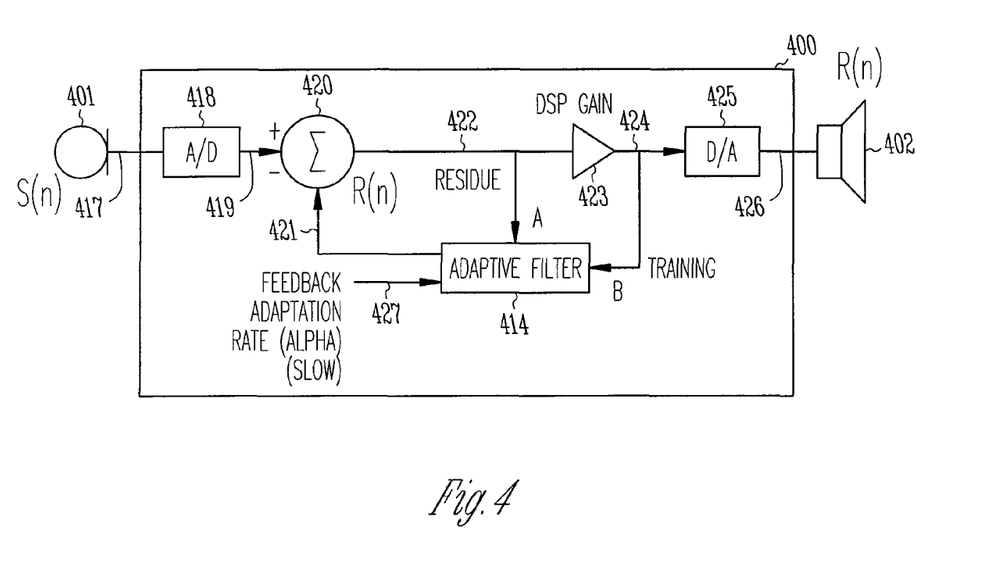
FIG. 4 illustrates signal flow for a hearing aid embodiment operating in the acoustic mode.

FIG. 4 illustrates signal flow for a hearing aid embodiment operating in the acoustic mode. The microphone 401 of the hearing instrument 400 converts a sound into an input analog signal 417, and an analog-to-digital (A/D) converter 418 converts the input analog signal into a digital input signal 419. A summer 420 receives the digital input signal 419 and subtracts a filter output signal 421 from the digital input signal 419 to provide a filtered input signal 422. A digital signal processor (DSP) processes the filtered input signal 422 providing frequency selective gain and compression at 423, and outputs a digital output signal 424. A digital-to-analog (D/A) converter 425 converts the digital output signal 424 into an analog output signal 426, which is received by the receiver 402 and converted into an acoustic signal by the receiver 402. The adaptive filter 414 receives a first signal input, also referred to as a residue signal (e.g. signal A), from the filtered input signal 422 and receives a second signal input, also referred to as a training signal (e.g. signal B), from the digital output signal 424. Using a slow adaptation rate 427, also referred to as a feedback adaptation rate, along with the residue and training signal inputs, the adaptive filter 414 provides a filter output signal 421 that is subtracted from the digital input signal 419. The adaptive filter 414 for the acoustic mode of operation provides an anti-correlation function for signals A and B, updating the filter output signal 421 at the slow adaptation rate 427 to prevent a correlation between the filtered input signal 422 and the digital output signal 424.

Figure 5:
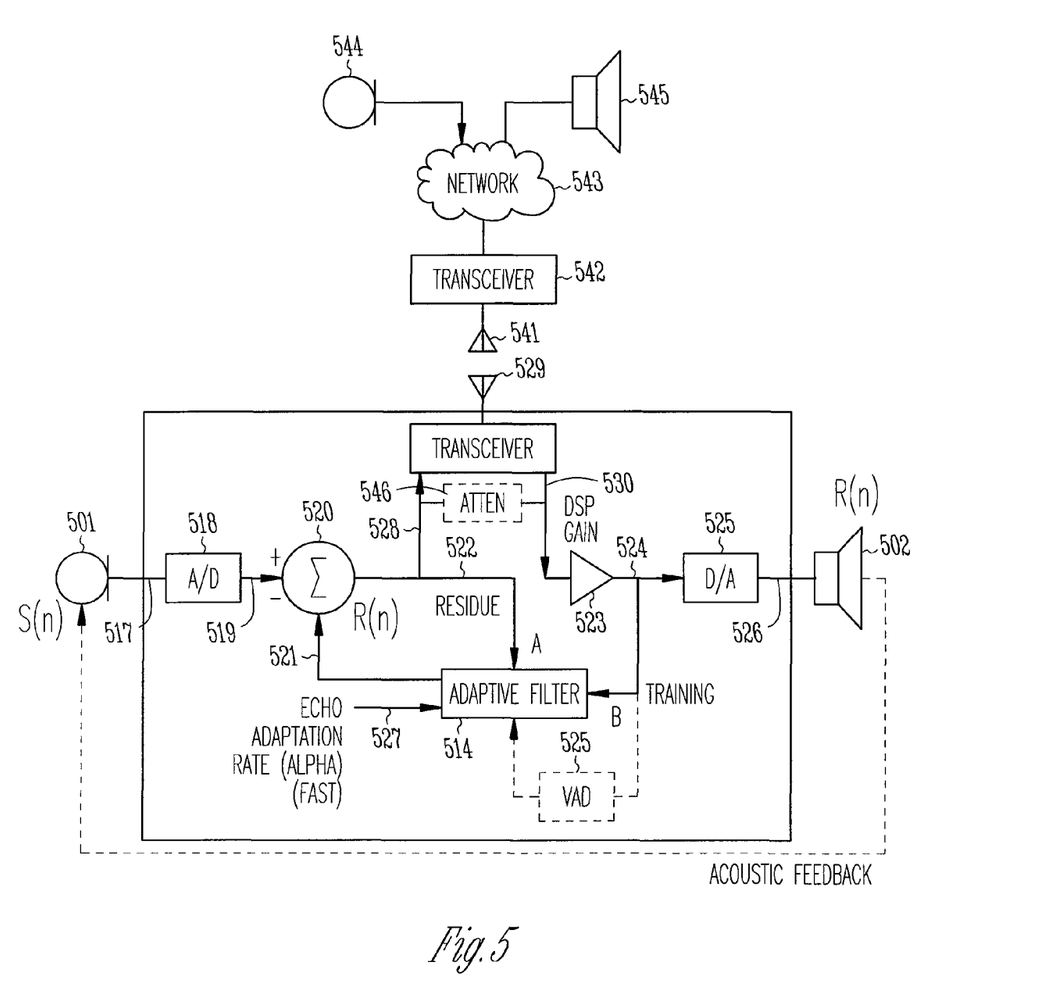
FIG. 5 illustrates signal flow for a hearing aid embodiment operating in the RF mode.

FIG. 5 illustrates signal flow for a hearing aid embodiment operating in the RF mode. The microphone 501 of the hearing instrument 500 converts a sound into an input analog signal 517, and an A/D converter 518 converts the input analog signal into a digital input signal 519. A summer 520 receives the digital input signal 519 and subtracts a filter output signal 521 from the digital input signal 519 to provide a filtered input signal 522. The filtered input signal 522 is provided as signal 528 to a transceiver, which use an antenna 529 to transmit a wireless (e.g. RF) signal representative of the filtered input signal. The transceiver uses the antenna 529 to receive a wireless (RF) signal, and convert the received signal into a received electrical signal 531. The illustrated transceiver provides functions of both a receiver and a transmitter. Some embodiments use an attenuator 546 for sidetone. The DSP processes the received electrical signal 530 at a gain at 523, and outputs a digital output signal 524. A D/A converter 525 converts the digital output signal 524 into an analog output signal 526, which is received by the receiver 502 and converted into an acoustic signal by the receiver 502. The adaptive filter 514 receives a first or residue signal input (e.g. signal A) from the filtered input signal 522 and receives a second or training signal input (e.g. signal B) from the digital output signal 524. Using a fast echo adaptation rate 527 along with the signal inputs, the adaptive filter 514 provides a filter output signal 521 that is subtracted from the digital input signal 519 to provide the residue signal. The adaptive filter 514 for the RF mode of operation provides an anti-correlation function for signals A and B, updating the filter output signal 521 at the fast adaptation rate 527 to prevent a correlation between the filtered input signal 522 and the received electrical signal 531. Thus, for a person speaking on phone 107 in FIG. 1, represented by the microphone 544 and receiver 545 connected via the network 543 and transceiver 542 by way of example and not limitation, the adaptive filter 514 prevents that person's voice that forms part of received electrical signal 530 from echoing back to the person within filtered input signal 522 through the acoustic pathway between the receiver 502 and microphone 501. Some embodiments use voice activity detector (VAD) 532 to enable the adaptive filter 514 when a voice is detected. The VAD 532 may monitor signal 524 or another signal for the presence of a voice. Other embodiments do not include a VAD to enable the adaptive filter 514.

Figure 6:
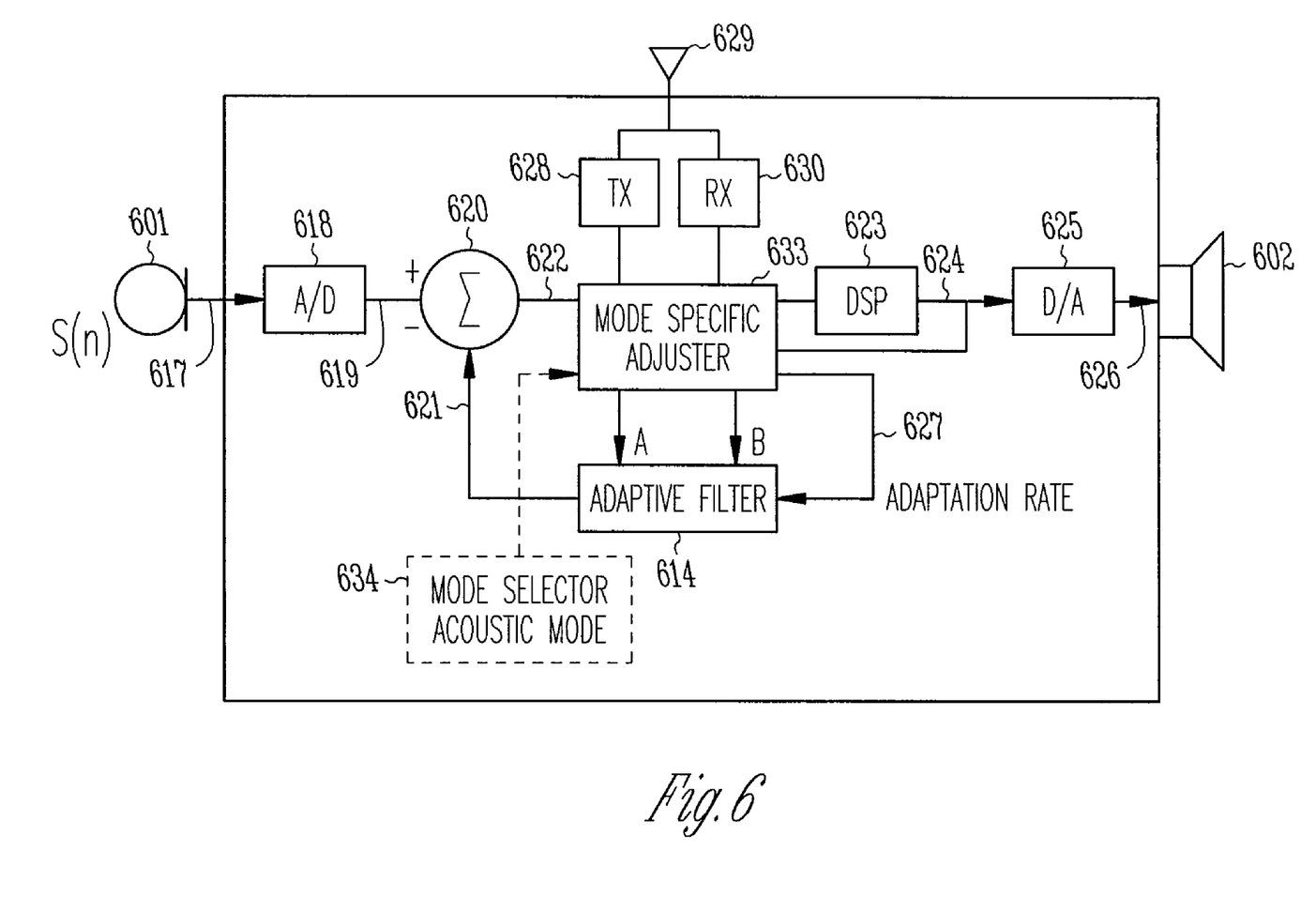
FIG. 6 illustrates an embodiment of a hearing instrument capable of selectively operating in both the acoustic mode and the RF mode.

FIG. 6 illustrates an embodiment of a hearing instrument capable of selectively operating in both the acoustic mode and the RF or echo mode. In the illustrated embodiment, both the acoustic and RF modes use the same hearing instrument components, including the microphone 601, the A/D converter 618, the summer 620, the antenna 629, the transceiver, the DSP gain 623, the D/A converter 625, the receiver 602 and the adaptive filter 614. The illustrated embodiment includes a mode specific adjuster 633 for making adjustments within the hearing instrument according to the selected mode 634 (acoustic mode or RF mode). The modes may be switched in a number of ways. For example, some embodiments default to operating in the acoustic mode, and automatically switch to the RF mode if a good RF signal is received by the device. Some embodiments switch only if the RF signal contains a code that matches a code stored in the hearing instrument. Some provide a switch for a wearer of the hearing instrument to manually switch between modes, and some embodiments allow the user to switch modes through another means such as a magnetic switch or a wireless signal from a device, by way of example but not limitation.

In the acoustic mode, sound entering microphone 601 feeds forward to output processed signal representative of the sound from the receiver 602. The microphone 601 converts a sound into an input analog signal 617, and an analog-to-digital (A/D) converter 618 converts the input analog signal into a digital input signal 619. A summer 620 receives the digital input signal 619 and subtracts a filter output signal 621 from the digital input signal 619 to provide a filtered input signal 622. The mode specific adjuster 633 adjusts the hearing instrument to pass the filtered input signal 622 to the DSP 623. The DSP processes the filtered input signal 622 at a gain, and outputs a digital output signal 624. The D/A converter 625 converts the digital output signal 624 into an analog output signal 626, which is received by the receiver 602 and converted into an acoustic signal by the receiver 602. The mode specific adjuster 633 provides the filtered input signal 622 as a residue signal input (e.g. signal A) to the adaptive filter 614, and provides the digital output signal 624 as a training signal input (e.g. signal B) to the adaptive filter 614. The mode specific adjuster 633 also controls the adaptation rate 627 for the adaptive filter, providing a slow adaptation rate for the acoustic mode. Using a slow adaptation rate 627 along with the signal inputs (signals A and B), the adaptive filter 614 provides a filter output signal 621 that is subtracted from the digital input signal 619. The adaptive filter 614 for the acoustic mode of operation provides an anti-correlation function for signals A and B, updating the filter output signal 621 at the slow adaptation rate 627 to prevent a correlation between the filtered input signal 622 and the digital output signal 624.

In the RF or echo mode, sound representative of a signal received by RF receiver 630 is output from the receiver 602, and the RF transmitter 628 transmits an RF signal representative of the sound detected by the microphone 602. The microphone 601 converts a sound into an input analog signal 617, and an analog-to-digital (A/D) converter 618 converts the input analog signal into a digital input signal 619. A summer 620 receives the digital input signal 619 and subtracts a filter output signal 621 from the digital input signal 619 to provide a filtered input signal 622. The mode specific adjuster 633 adjusts the hearing instrument to pass the filtered input signal 622 to the transmitter 628, and to pass received signals from the RF receiver 630 to the DSP. The DSP processes the received signals from the RF receiver 630 at a gain, and outputs a digital output signal 624. The D/A converter 625 converts the digital output signal 624 into an analog output signal 626, which is received by the receiver 602 and converted into an acoustic signal by the receiver 602. The mode specific adjuster 633 provides the filtered input signal 622 as a residue signal input (e.g. signal A) to the adaptive filter 614, and provides digital output signal 624 as the training signal input (e.g. signal B) to the adaptive filter 614. The mode specific adjuster 633 also controls the adaptation rate 627 for the adaptive filter, providing a fast adaptation rate for the RF mode. Using a fast adaptation rate 627 along with the residue and training signal inputs (signals A and B), the adaptive filter 614 provides a filter output signal 621 that is subtracted from the digital input signal 619. The adaptive filter 614 for the RF mode of operation provides an anti-correlation function for signals A and B, updating the filter output signal 621 at the fast adaptation rate 627 to prevent a correlation between the filtered input signal 622 presented to the RF transmitter 628 and the received signal from the RF receiver 630, which effectively cancels an echo at a far end of a communication channel (e.g. at phone 107 in FIG. 1).

Figure 7:
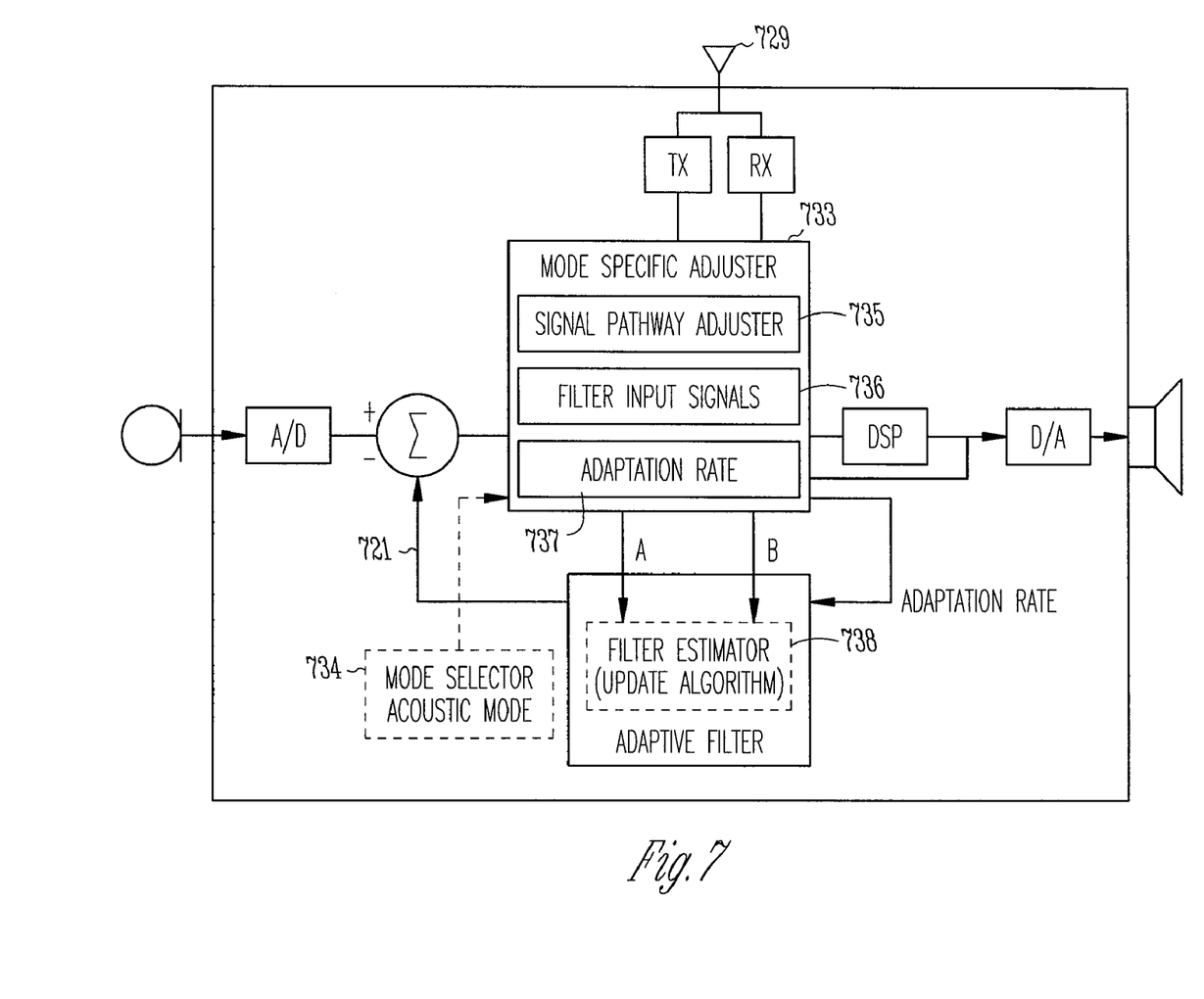
FIG. 7 illustrates an embodiment of a hearing instrument capable of selectively operating in both the acoustic mode and the RF mode.

FIG. 7 illustrates an embodiment of a hearing instrument capable of selectively operating in both the acoustic mode and the RF mode. FIG. 7 is similar to FIG. 6, illustrating the mode specific adjuster 733 and the adaptive filter 714 in more detail. The illustrated mode specific adjuster 733 includes a signal pathway adjuster 735 for adjusting or selecting signal pathways appropriate for the acoustic mode or the RF mode. The mode specific adjuster 733 includes filter input signals selector to control which signals are delivered to the adaptive filter 714 as the residue and training input signals (signals A and B) for the filter in the acoustic mode and the RF mode. The illustrated mode specific adjuster 733 includes an adaptation rate selector 737 which controls the adaptation rate of the filter 714 to provide a fast adaptation rate for the RF mode and a slow adaptation rate for the acoustic mode. The illustrated adaptive filter 714 includes a filter estimator 738 that has an update algorithm that receives the filter input signals A and B, and provides an updated filter output signal 721 at the adaptation rate 727.

Figure 8:
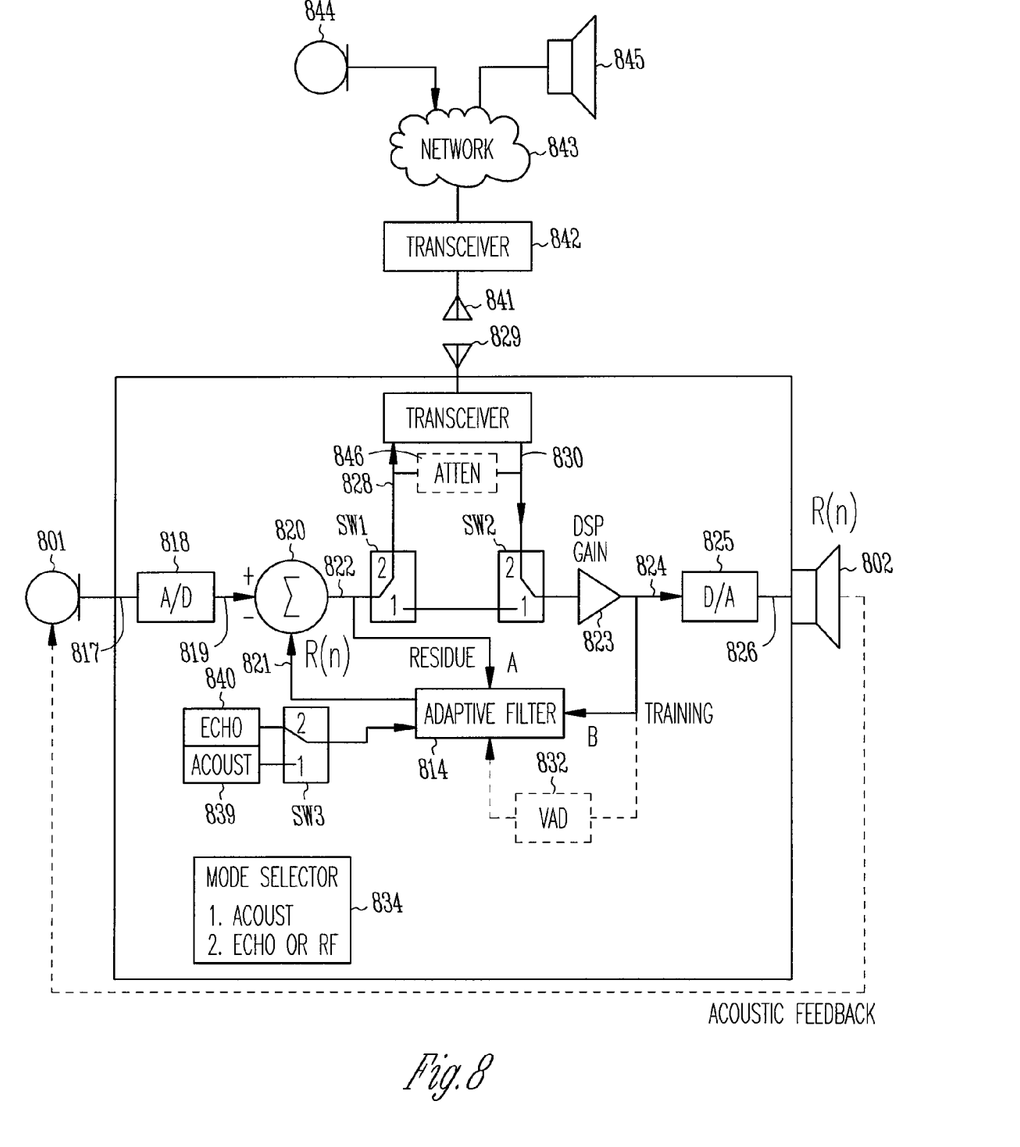
FIG. 8 illustrates signal flow for an embodiment of a hearing instrument capable of selectively operating in both the acoustic mode and the RF mode.

FIG. 8 illustrates signal flow for an embodiment of a hearing instrument capable of selectively operating in both the acoustic mode and the RF mode. The illustrated switches are not intended to identify a specific type of switch, but rather are intended to provide an illustration of the signal pathway, filter input signals, and adaptation rate can be changed when switching between the acoustic and RF modes of operation.

The mode selector 834 controls the mode in which the hearing instrument operates. The modes may be switched in a number of ways. For example, some embodiments default to operating in the acoustic mode, and automatically switch to the RF mode if a good RF signal is received by the device. Some embodiments switch only if the RF signal contains a code that matches a code stored in the hearing instrument. Some provide a switch for a wearer of the hearing instrument to manually switch between modes, and some embodiments allow the user to switch modes through another means such as a magnetic switch or a wireless signal from a device, by way of example but not limitation. In the embodiment illustrated in FIG. 8, the mode selector 834 controls switches to provide appropriate signal pathways, filter input signals, and adaptation rate for each of the acoustic and RF modes. The switches SW1, SW2 and SW3 are in position 1 for the acoustic mode and are in position 2 for the RF mode.

In the acoustic mode, sound entering microphone 801 feeds forward to output processed signal representative of the sound from the receiver 802. The microphone 801 converts a sound into an input analog signal 817, and an A/D converter 818 converts the input analog signal into a digital input signal 819. A summer 820 receives the digital input signal 819 and subtracts a filter output signal 821 from the digital input signal 819 to provide a filtered input signal 822. Switches SW1 and SW2 pass the filtered input signal 822, which the DSP processes at a gain at 823, and outputs a digital output signal 824. The D/A converter 825 converts the digital output signal 824 into an analog output signal 826, which is received by the receiver 802 and converted into an acoustic signal by the receiver 802. The filtered input signal 822 is provided as a residue signal input to the adaptive filter 814, and the digital output signal 824 is provided as a training signal input to the adaptive filter 814. Switch SW3 selects to use the acoustic adaptation coefficient (e.g. slow rate) 839 for the adaptation rate used in the adaptive filter 814. Using the slow adaptation rate 839 received through control 827, along with the residue and training signal inputs (signals A and B), the algorithm within the adaptive filter 814 provides a filter output signal 821 that is subtracted from the digital input signal 819. The adaptive filter 814 for the acoustic mode of operation provides an anti-correlation function for signals A and B, updating the filter output signal 821 at the slow adaptation rate to prevent a correlation between the filtered input signal 822 and the digital output signal 824.

In the RF mode, sound representative of a signal received by the transceiver from the antenna 829 is output from the hearing instrument receiver 802, and the transceiver transmits an RF signal representative of the sound detected by the microphone 802. The microphone 801 converts a sound into an input analog signal 817, and an A/D converter 818 converts the input analog signal into a digital input signal 819. A summer 820 receives the digital input signal 819 and subtracts a filter output signal 821 from the digital input signal 819 to provide a filtered input signal 822. The filtered input signal 822 passes through switch SW1 as the transmit signal 828 and a received signal 830 from the transceiver are passed through SW2. Some embodiments provide an attenuator 846 for sidetone. The DSP processes the received signals from the RF receiver 830 at a gain 823, and outputs a digital output signal 824. The D/A converter 825 converts the digital output signal 824 into an analog output signal 826, which is received by the receiver 802 and converted into an acoustic signal by the receiver 802. The filtered input signal 822 is provided as a residue signal input to the adaptive filter 814, and the digital output signal 824 is provided as a training signal input to the adaptive filter. Switch SW3 selects to use the wireless adaptation coefficient or RF adaptation coefficient (e.g. fast rate) 840 for the adaptation rate used in the adaptive filter 814. Using the fast adaptation rate 840 along with the residue and training signal inputs (signals A and B), the algorithm within the adaptive filter 814 provides a filter output signal 821 that is subtracted from the digital input signal 819. The adaptive filter 814 for the RF mode of operation provides an anti-correlation function for signals A and B, updating the filter output signal 821 at the fast adaptation rate to prevent a correlation between the filtered input signal 822 and the received signal, which effectively cancels an echo at a far end of a communication channel (e.g. at phone 107 in FIG. 1). Thus, for a person speaking on phone 107 in FIG. 1, represented by the microphone 844 and receiver 845 connected via the network 843 and transceiver 842 by way of example and not limitation, the adaptive filter 814 prevents that person's voice that forms part of received electrical signal 830 from echoing back to the person within filtered input signal 832 through the acoustic pathway between the receiver 802 and microphone 801.

Some embodiment use VAD 832 to enable the adaptive filter 814 when a voice is detected. The VAD 832 may monitor signal 831 or another signal (e.g. signal 824) for the presence of a voice. Other embodiments do not include a VAD to enable the adaptive filter 814 within the RF mode.

The above detailed description is intended to be illustrative, and not restrictive. The scope of the invention should, therefore, be determined with reference to the appended claims, along with the full scope of equivalents to which such claims are legally entitled.

What is claimed is:

1. A hearing instrument configured to be worn on or in a wearer's ear, comprising:
   a microphone;
   a hearing instrument (HI) receiver;
   a signal processor;
   an RF antenna, an RF receiver, and an RF transmitter;
   an analog-to-digital (A/D) converter in communication with the microphone;
   a summer in communication with the A/D converter:
   an adaptive filter configured to deliver a filter output signal to the summer to subtract the filter output signal from a signal from the A/D converter;
   a mode specific adjuster in communication with the summer, the RF transmitter, the RF receiver, the signal processor, and the adaptive filter; and
   a digital-to-analog (D/A) converter in communication between the signal processor and the HI receiver,
   wherein the hearing instrument is configured to operate in an acoustic mode and a two-way RF mode;
   wherein in the acoustic mode, the signal processor processes a signal representative of a sound detected by the microphone into a processed signal, and the HI receiver outputs an audio signal representative of the processed signal;
   wherein in the RF mode, the RF transmitter transmits, using the antenna, a signal representative of a sound detected by the microphone, the signal processor processes a signal representative of a signal received by the RF receiver using the antenna, and the HI receiver outputs an audio signal representative of the processed signal; and
   wherein the mode specific adjuster is configured to provide an acoustic signal path from the summer to the signal processor in the acoustic mode, and provide an RF transmit signal path from the summer to the RF transmitter and provide an RF receive signal path from the RF receiver to the signal processor in the RF mode.

2. The hearing instrument of claim 1, further comprising an wherein the adaptive filter is configured to operate with a first adaptation rate for the acoustic mode and with a second adaptation rate for the RF mode, wherein the first adaptation rate is slower than the second adaptation rate.

3. The hearing instrument of claim 2, wherein a digital sound signal is received by the RF receiver, and the second adaptation rate for the RF mode is approximately equal to a sample rate of the digital sound signal.

4. The hearing instrument of claim 1, wherein the adaptive filter is configured to receive filter input signals and wherein the hearing instrument is configured to switch at least one of the filter input signals to switch between the RF and acoustic modes of operation.

5. The hearing instrument of claim 3, further comprising a voice activity detector (VAD) configured to enable the adaptive filter when a voice is detected and when the hearing instrument is operating in the RF mode of operation.

6. The hearing instrument of claim 1, wherein the mode specific adjuster is configured to provide the adaptive filter with a first adaptation rate for the acoustic mode and a second adaptation rate for the RF mode, and wherein the second adaptation rate is faster than the first adaptation rate.

7. The hearing instrument of claim 6, wherein the second adaption rate for the RF mode is approximately equal to a sample rate of a digital sound signal.

8. The hearing instrument of claim 6, wherein:
   for the acoustic mode, the mode specific adjuster is configured to provide an output signal from the summer as a first filter input signal to the adaptive filter and an output from the signal processor as a second filter input signal to the adaptive filter; and
   for the RF mode, the mode specific adjuster is configured to provide an input signal to the RF transmitter as the first filter input signal to the adaptive filter and an output signal from the RF receiver as the second filter input signal to the adaptive filter.

9. A hearing instrument configured to be worn on or in a wearer's ear, comprising:
   a microphone;
   a hearing instrument (HI) receiver;
   a signal processor;
   an RF antenna, an RF receiver, and an RF transmitter;
   an analog-to-digital (A/D) converter in communication with the microphone;
   a summer in communication with the A/D converter:
   an adaptive filter configured to deliver a filter output signal to the summer to subtract the filter output signal from a signal from the A/D converter;
   a mode specific adjuster in communication with the summer, the RF transmitter, the RF receiver, the signal processor, and the adaptive filter; and
   a digital-to-analog (D/A) converter in communication between the signal processor and the HI receiver,
   wherein the hearing instrument is configured to operate in an acoustic mode and a two-way RF mode,
   wherein in the acoustic mode, the signal processor processes a signal representative of a sound detected by the microphone into a processed signal, and the HI receiver outputs an audio signal representative of the processed signal,
   wherein in the RF mode, the RF transmitter transmits, using the antenna, a signal representative of a sound detected by the microphone, the signal processor processes a signal representative of a signal received by the RF receiver using the antenna, and the HI receiver outputs an audio signal representative of the processed signal,
   wherein the mode specific adjuster is configured to adjust signal pathways when switching between the acoustic and RF modes of operation,
   wherein for the RF mode of operation, the mode specific adjuster provides an RF receive signal path from the RF receiver to the signal processor, and an RF transmit signal path from the microphone to the RF transmitter, and
   wherein for the acoustic mode of operation, the mode specific adjuster provides an acoustic signal path from the microphone to the signal processor.

10. The hearing instrument of claim 9, further comprising:
an adaptive filter adapted to provide a filter output signal at an adaptation rate using a first filter input signal, and a second filter input signal,
wherein the mode specific adjuster is adapted to change at least one of the first or second filter input signals when switching between acoustic and RF modes of operation.

11. The hearing instrument of claim 9, further comprising:
an adaptive filter adapted to provide a filter output signal at an adaptation rate using a first filter input signal and a second filter input signal,
wherein the mode specific adjuster is adapted to change adaptation rates when switching between acoustic and RF modes of operation.

12. The hearing instrument of claim 11, wherein a digital sound signal is received by the RF receiver, and the adaptation rate for the RF mode is approximately equal to a sample rate of the digital sound signal.

13. The hearing instrument of claim 9, further comprising:
an adaptive filter adapted to provide a filter output signal at an adaptation rate using a first filter input signal, and a second filter input signal;
wherein the mode specific adjuster is adapted to change at least one of the first or second filter input signals when switching between acoustic and RF modes of operation, and is adapted to change adaptation rates when switching between acoustic and RF modes of operation.

14. The hearing instrument of claim 9, further comprising:
an adaptive filter to provide a filter output signal for subtraction from an input signal; and
a voice activity detector (VAD) configured to enable the adaptive filter when a voice is detected, if the hearing instrument is operating in the RF mode of operation.

15. A method of operating a hearing instrument comprising:
a microphone;
a hearing instrument (HI) receiver;
a signal processor;
an RF antenna, an RF receiver, and an RF transmitter;
an analog-to-digital (A/D) converter in communication with the microphone;
a summer in communication with the A/D converter:
an adaptive filter configured to deliver a filter output signal to the summer to subtract the filter output signal from a signal from the A/D converter;
a mode specific adjuster in communication with the summer, the RF transmitter, the RF receiver, the signal processor, and the adaptive filter; and
a digital-to-analog (D/A) converter in communication between the signal processor and the HI receiver,
the method comprising:
in an acoustic mode of operation, providing an acoustic signal pathway from a microphone through a signal processor to a hearing instrument (HI) receiver; and
in a RF mode of operation, providing an RF transmit signal pathway from the microphone to an RF transmitter, and providing an RF receive signal pathway from the RF receiver through the signal processor to the HI receiver.

16. The method of claim 15, further comprising adaptively filtering an input signal representative of sound detected by the microphone, including using a first adaptation rate for the acoustic mode of operation and using a second adaptation rate for the RF mode of operation, wherein the second adaptation rate is faster than the first adaptation rate.

17. The method of claim 16, further comprising, in the RF mode of operation, enabling adaptive filtering when a voice is detected.

18. The method of claim 16, wherein using the second adaptation rate includes using a rate approximately equal to a sampling rate for a digital audio communication signal in the RF mode.

19. The method of claim 16, further comprising changing between the acoustic and RF modes, wherein adaptively filtering the input signal includes changing at least one filter input signal to an adaptive filter when changing between the acoustic and RF modes.

20. The method of claim 15, further comprising adaptively filtering an input signal representative of sound detected by the microphone, wherein adaptively filtering the input signal includes, for the acoustic mode of operation, performing an anti-correlation function between input and output signals for the signal processor.

21. The method of claim 15, further comprising adaptively filtering an input signal representative of sound detected by the microphone, wherein adaptively filtering the input signal includes, for the RF mode of operation, performing an anti-correlation function between a receive signal on the RF receive signal pathway and a transmit signal on the RF transmit signal pathway.

22. The method of claim 15, further comprising adaptively filtering an input signal representative of sound detected by the microphone, wherein adaptively filtering the input signal includes:
for the acoustic mode of operation, performing an anti-correlation function between input and output signals for the signal processor, and using a first adaptation rate; and
for the RF mode of operation, performing an anti-correlation function between a receive signal on the RF receive signal pathway and a transmit signal on the RF transmit signal pathway, and using a second adaptation rate, wherein the second adaptation rate is faster than the first adaptation rate.

* * * * *

UNITED STATES PATENT AND TRADEMARK OFFICE
CERTIFICATE OF CORRECTION

PATENT NO. : 8,229,147 B2  
APPLICATION NO. : 12/402849  
DATED : July 24, 2012  
INVENTOR(S) : Kindred et al.

Page 1 of 1

It is certified that error appears in the above-identified patent and that said Letters Patent is hereby corrected as shown below:

On the title page, in column 2, Item (57) under "Abstract", line 1, after "method", insert --,--, therefor Signed and Sealed this  
Eighteenth Day of November, 2014

Michelle K. Lee  
*Deputy Director of the United States Patent and Trademark Office*